(12) United States Patent
Aoi et al.

(10) Patent No.: US 7,574,097 B2
(45) Date of Patent: Aug. 11, 2009

(54) POLYSILANE COMPOSITION, OPTICAL WAVEGUIDE AND METHOD FOR FABRICATION THEREOF

(75) Inventors: Kazunori Aoi, Neyagawa (JP); Emi Watanabe, Neyagawa (JP); Hiroshi Oda, Neyagawa (JP); Yoshifumi Ichinose, Tokyo (JP)

(73) Assignee: Nippon Paint Co., Ltd., Osaka (JP)

( * ) Notice: Subject to any disclaimer, the term of this patent is extended or adjusted under 35 U.S.C. 154(b) by 477 days.

(21) Appl. No.: 11/406,363

(22) Filed: Apr. 19, 2006

(65) Prior Publication Data

US 2006/0240269 A1 Oct. 26, 2006

(30) Foreign Application Priority Data

Apr. 20, 2005 (JP) .............................. 2005/122191

(51) Int. Cl.
*G02B 6/00* (2006.01)

(52) U.S. Cl. ..................... 385/143; 385/145; 385/141

(58) Field of Classification Search ....................... None
See application file for complete search history.

(56) References Cited

U.S. PATENT DOCUMENTS

| | | | |
|---|---|---|---|
| 7,035,518 B2* | 4/2006 | Imoto | 385/132 |
| 2005/0002629 A1* | 1/2005 | Okamoto et al. | 385/129 |

FOREIGN PATENT DOCUMENTS

| | | |
|---|---|---|
| JP | 2002-311263 A | 10/2002 |
| JP | 2004-333883 A | 11/2004 |

\* cited by examiner

*Primary Examiner*—Frank G Font
*Assistant Examiner*—Eric Wong
(74) *Attorney, Agent, or Firm*—Kubovcik & Kubovcik (57) ABSTRACT

A polysilane composition characterized as containing a polysilane compound and a silicone compound in the ratio (polysilane compound:silicon compound) by weight of 80:20-5:95, and also containing an organic peroxide in the amount of 1-30 parts by weight, based on 100 parts by weight of the polysilane compound and silicone compound, wherein the silicone compound contains 40-100% by weight of a double bond containing silicon compound.

3 Claims, 3 Drawing Sheets

POLYSILANE COMPOSITION, OPTICAL WAVEGUIDE AND METHOD FOR FABRICATION THEREOF

BACKGROUND OF THE INVENTION

1. Field of the Invention

The present invention relates to a polysilane composition useful as a material for forming core and cladding layers of a polymer optical waveguide, an optical waveguide fabricated using the polysilane composition and a method for fabrication of the optical waveguide.

2. Description of the Related Art

Polymer waveguides can be supplied in larger sectional areas and fabricated by simple techniques and at low costs. Because of such advantages, their practical application has been expected. Polymer waveguides are typically built by providing cladding layers in a manner to surround a core layer. In general, the core layer is laterally surrounded by a lateral cladding layer and flanked on its vertical sides by an upper cladding layer and a lower cladding layer. For example, a polymer optical waveguide is proposed which uses a polysilane compound for such core and lateral cladding layers (Japanese Patent Laying-Open No. 2002-311263).

Conventionally, the use of a single-mode optical fiber has been a mainstream of an optical communication system. This has led to extensive research and development of single-mode optical waveguides. A single-mode optical waveguide provides easy control of guided light, is advantageous in miniaturizing a device and is suited for high-speed operation.

However, the recent rapid rise of multi-media demands high-speed transfer of optical signals to offices and houses. Under such circumstances, a multi-mode optical waveguide is gaining an increasing attention as an inexpensive optical part.

Because core and lateral cladding layers in multi-mode optical waveguides generally have large thickness dimensions, the use of conventional polymer materials for those layers results in the failure to achieve uniform photobleaching in the formation of the lateral cladding layer, which has been a problem.

In order to solve the above-described problem, Japanese Patent Laying-Open No. 2004-333883 proposes the use of a polysilane composition containing a polysilane compound, a silicone compound and an organic peroxide in the formation of core and lateral cladding layers. The use of such a polysilane composition enables short-time and uniform photobleaching of the lateral cladding layer even if having a thickness of 20 μm.

However, the use of this polysilane composition results in problematic failure to simultaneously achieve optimization of a core shape and minimization of a propagation loss and a coupling loss. That is, a higher proportion of the polysilane compound improves a core shape but increases the propagation loss and coupling loss. On the other hand, a lower proportion of the silicone compound or a lower prebaking temperature, in the attempt to reduce those losses, softens a film. Then, a core goes out of shape to result in the problematic failure to obtain a satisfactory core shape.

SUMMARY OF THE INVENTION

It is an object of the present invention to provide a polysilane composition which can be formed into core and cladding layers while assuring optimization of a core shape and minimization of a propagation loss and a coupling loss in an optical waveguide, an optical waveguide fabricated using this polysilane composition and a method for fabrication of the optical waveguide.

The polysilane composition of the present invention is characterized in that it contains a polysilane compound and a silicone compound in the ratio (polysilane compound:silicon compound) by weight of 80:20-5:95, and an organic peroxide in the amount of 1-30 parts by weight, based on 100 parts by weight of the aforesaid polysilane compound and silicone compound, wherein the silicone compound contains 40-100% by weight of a double bond-containing silicone compound.

In the polysilane composition of the present invention, the double bond-containing silicone compound accounts for 40-100% by weight of the silicone compound. Inclusion of the double bond-containing silicone compound allows the polysilane composition in its region exposed to an ultraviolet radiation to be converted to a shape-retaining lateral cladding layer. Accordingly, optimization of a core shape and minimization of a propagation loss and a coupling loss can be simultaneously achieved.

In the present invention, the double bond in the silicone compound is preferably in the form of a vinyl, allyl, acryloyl or methacryloyl group.

Preferably, the polysilane compound in the present invention is a branched polysilane compound.

The optical waveguide of the present invention is characterized as comprising a core layer, a lateral cladding layer located to laterally surround the core layer, a lower cladding layer located to underlie the core layer and the lateral cladding layer, and an upper cladding layer located to overlie the core layer and the lateral cladding layer, wherein the core layer and the lateral cladding layer are both formed from the polysilane composition of the present invention.

In the optical waveguide of the present invention, the lower cladding layer and/or the upper cladding layer may also be formed from the polysilane composition of the present invention.

The fabrication method of the present invention enables fabrication of the optical waveguide of the present invention.

A first aspect according to the fabrication method of the present invention is characterized as including the steps of forming a lower cladding layer on a substrate, coating the polysilane composition of the present invention onto the lower cladding layer to form a polysilane layer, exposing a region of the polysilane layer that corresponds to a lateral cladding layer to an ultraviolet radiation so that the exposed region constitutes the lateral cladding layer and the unexposed region constitutes a core layer, and forming an upper cladding layer on the core layer and the lateral cladding layer.

A second aspect according to the fabrication method of the present invention is characterized as including the steps of forming a lower cladding layer on a substrate, coating the polysilane composition of the present invention onto the lower cladding layer to form a polysilane layer, exposing a region of the polysilane layer that corresponds to a lateral cladding layer to an ultraviolet radiation so that the exposed region constitutes the lateral cladding layer and the unexposed region constitutes a core layer, and exposing the respective upper regions of the lateral cladding layer and the core layer to an ultraviolet radiation so that the upper regions are converted to an upper cladding layer.

In accordance with the second aspect of the fabrication method of the present invention, the core, lateral cladding and upper cladding layers can be formed from the polysilane layer. Accordingly, the second aspect can omit one coating step from the first aspect and simplify the fabrication process.

A third aspect according to the fabrication method of the present invention is characterized as including the steps of coating the polysilane composition of the present invention on a substrate to form a polysilane layer, exposing a region of the polysilane layer that corresponds to a lateral cladding layer to an ultraviolet radiation so that the exposed region constitutes the lateral cladding layer and the unexposed region constitutes a core layer, exposing the respective lower regions of the lateral cladding layer and the core layer, through the substrate, to an ultraviolet radiation so that the lower regions are converted to a lower cladding layer, and exposing the respective upper regions of the lateral cladding layer and the core layer to an ultraviolet radiation so that the upper regions are converted to an upper cladding layer.

In accordance with the third aspect of the fabrication method of the present invention, all the core, lateral cladding, upper cladding and lower cladding layers can be formed from the polysilane layer. Accordingly, the third aspect involves a smaller number of coating steps, compared to the first and second aspects, and can simplify the fabrication process considerably.

The present invention is below described in more detail.

(Polysilane)

Although either of linear and branched polysilanes can be used in the present invention, the use of branched polysilane is particularly preferred. Linear and branched polysilanes are distinguished from each other by a binding state of an Si atom contained therein. The branched polysilane refers to polysilane containing an Si atom with the number of bonds (binding number) to neighboring Si atoms being 3 or 4. On the other hand, the linear polysilane contains an Si atom with the number of bonds to neighboring Si atoms being 2. Because an Si atom normally has a valence of 4, the Si atom having the binding number of 3 or less, if present among Si atoms in polysilane, is bound to a hydrocarbon group, an alkoxy group or a hydrogen atom, as well as to neighboring Si atoms. The preferred hydrocarbon group is an aliphatic hydrocarbon group having a carbon number of 1-10, either substituted or unsubstituted with halogen, or an aromatic hydrocarbon group having a carbon number of 6-14. Specific examples of aliphatic hydrocarbon groups include chain hydrocarbon groups such as methyl, propyl, butyl, hexyl, octyl, decyl, trifluoropropyl and nonafluorohexyl groups; and alicyclic hydrocarbon groups such as cyclohexyl and methylcyclohexyl groups. Specific examples of aromatic hydrocarbon groups include phenyl, p-tolyl, bi-phenyl and anthracyl groups. The alkoxy group may have a carbon number of 1-8. Specific examples of such alkoxy groups include methoxy, ethoxy, phenoxy and octyloxy. If easy synthesis is considered, methyl and phenyl groups are particularly preferred among them. The refractive index can be adjusted by suitable selection of particular polysilane structures. When a high refractive index is desired, a diphenyl group may be introduced. On the other hand, when a lower refractive index is desired, a dimethyl content may be increased.

Preferably, Si atoms having 3 or 4 bonds to neighboring Si atoms constitute at least 2% of a total number of Si atoms present in the branched polysilane. Because the branched polysilane containing less than 2% of such Si atoms and the linear polysilane are both highly crystalline, the use of such highly crystalline polysilanes likely results in the production of microcrystallites in a film. This causes light scattering and lowers transparency.

The polysilane for use in the present invention can be produced by a polycondensation reaction that occurs when a halogenated silane compound is heated in an organic solvent such as n-decane or toluene, under the presence of sodium or any other alkaline metal, to 80° C. or above. Other applicable synthesis methods include an electrolytic polymerization method and those using metallic magnesium and metal chloride.

The branched polysilane within the purpose of the present invention can be obtained by thermal polycondensation of a halosilane mixture containing an organotrihalosilane compound, a tetrahalosilane compound and a diorganodihalosilane compound, wherein the organotrihalosilane and tetrahalosilane compounds are present in the amount of at least 2 mole %, based on the total amount of the halosilane mixture. In this case, the organo-trihalosilane compound serves as a source of Si atoms having 3 bonds to neighboring Si atoms and the tetrahalosilane compound serves as a source of Si atoms having 4 bonds to neighboring Si atoms. The network structure can be identified such as by measurement of an ultraviolet absorption spectrum or a nuclear magnetic resonance spectrum for silicon.

Preferably, the respective halogen atoms in the foregoing organotrihalosilane compound, tetrahalosilane compound and diorganodihalosilane compound, for use as raw material of polysilane, are all chlorine atoms. Besides such halogen atoms, the organotrihalosilane and diorganodihalosilane compounds may have a substituent group, examples of which include the above-listed hydrocarbon and alkoxy groups and a hydrogen atom.

The branched polysilane is not particularly specified in type, so long as it is soluble in an organic solvent and can be coated to form a transparent film. Such organic solvents are preferably based on hydrocarbons having carbon numbers of 5-12, halogenated hydrocarbons or ethers.

Examples of hydrocarbon-based organic solvents include pentane, hexane, heptane, cyclohexane, n-decane, n-dodecane, benzene, toluene, xylene and methoxybenzene. Examples of halogenated hydrocarbon-based organic solvents include carbon tetrachloride, chloroform, 1,2-dichloroethane, dichloro-methane and chlorobenzene. Examples of ether-based organic solvents include diethyl ether, dibutyl ether and tetra-hydrofuran.

The use of the branched polysilane with a higher branching coefficient results in the higher light transmittance, provided that it has a branching coefficient of at least 2%. Deuterated and partially or wholly halogenated, particularly fluorinated, branched polysilanes can also be used. Therefore, the branched polysilane, if properly selected, restrains absorption of a light at a specific wavelength, shows high light transmittance over a wide wavelength range, enables occurrence with high sensitivity and precision of a refractive index change upon exposure to an ultraviolet radiation, and improves thermal stability of the resulting refractive index.

(Silicone Compound)

In the present invention, a silicone compound is used such that it contains 40-100% by weight, preferably 50-100% by weight of a double bond-containing silicone compound.

The double bond in the silicone compound is preferably in the form of vinyl, allyl, acryloyl or methacryloyl group, as described above. Among silicone compounds generally called silane coupling agents, those having a double can be used. The silicone compound preferably has a weight average molecular weight Mw in the range of 100-10,000, more preferably 100-5,000. It preferably has an iodine number in the range of 10-254. The number of double bonds per molecule may be two or more. Such silicone compounds are useful as a crosslinking agent and can be illustrated by a vinyl-containing methylphenyl silicone resin having a double bond content by weight of 1-30%.

Useful double bond-containing silicone compounds are sold in the market, examples of which are listed in the following Table 1.

TABLE 1

| Double Bond | Producer | Product Name | Type of Silicone Compound | Mw |
|---|---|---|---|---|
| Vinyl | Shin-Etsu Silicone | KBM-1003 | Vinyltrimethoxysilane | 148.2 |
| | Shin-Etsu Silicone | KBE-1003 | Vinyltriethoxysilane | 190.3 |
| | Shin-Etsu Silicone | KR-2020 | Vinyl-containing Phenylmethylsilicone Resin | 2900 |
| | Shin-Etsu Silicone | X-40-2667 | Vinyl-containing Phenylmethylsilicone Resin | 2600 |
| | Toray-Dow Silicone | SZ-6300 | Vinyltrimethoxysilane | |
| | Toray-Dow Silicone | SZ-6075 | Vinyltriacetoxysilane | |
| | Toray-Dow Silicone | CY52-162 | Vinyl-containing Silicone Resin | |
| | Toray-Dow Silicone | CY52-190 | Vinyl-containing Silicone Resin | |
| | Toray-Dow Silicone | CY52-276 | Vinyl-containing Silicone Resin | |
| | Toray-Dow Silicone | CY52-205 | Vinyl-containing Silicone Resin | |
| | Toray-Dow Silicone | SE1885 | Vinyl-containing Silicone Resin | |
| | Toray-Dow Silicone | SE1886 | Vinyl-containing Silicone Resin | |
| | Toray-Dow Silicone | SR-7010 | Vinyl-containing Phenylmethylsilicone Resin | |
| | GE-Toshiba Silicone | TSL8310 | Vinyltrimethoxysilane | |
| | GE-Toshiba Silicone | TSL8311 | Vinyltriethoxysilane | |
| | GE-Toshiba Silicone | XE5844 | Vinyl-containing Phenylmethylsilicone Resin | |
| Methacryloyl | Shin-Etsu Silicone | KBM-502 | 3-methacryloxypropylmethyldimethoxysilane | 232 |
| | Shin-Etsu Silicone | KBM-503 | 3-methacryloxypropyltrimethoxysilane | 248.4 |
| | Shin-Etsu Silicone | KBE-502 | 3-methacryloxypropylmethyldiethoxysilane | 260.4 |
| | Shin-Etsu Silicone | KBE-503 | 3-methacryloxypropyltriethoxysilane | 290.4 |
| | Toray-Dow Silicone | SZ-6030 | γ-methacryloxypropyltrimethoxysilane | |
| | GE-Toshiba Silicone | TSL8370 | γ-methacryloxypropyltrimethoxysilane | |
| | GE-Toshiba Silicone | TSL8375 | γ-methacryloxypropylmethyldimethoxysilane | |
| Acryloyl | Shin-Etsu Silicone | KBM-5103 | 3-acryloxypropyltrimethoxysilane | 234.3 |

In the present invention, the double bond-containing silicone compound may be used in combination with the other silicone compound such as disclosed in Japanese Patent Laying-Open No. 2004-333883. Specifically, such a silicone compound is represented by the following general formula:

wherein in the formula, $R_1$-$R_{12}$ are independently a group selected from the group consisting of an aliphatic hydrocarbon group having a carbon number of 1-10, either substituted or unsubstituted with halogen or a glycidyloxy group, an aromatic hydrocarbon group having a carbon number of 6-12 and an alkoxy group having a carbon number of 1-8; they may be identical or different from each other; and a, b, c and d are independently an integer inclusive of 0 and satisfy a+b+c+d≧1.

More specifically, such silicon compounds result from hydrolytic condensation of dichlorosilane having two organic substituents, called a D-structure, and trichlorosilane having one organic substituent, called a T-structure, either with or without one or more other complementary components, for example.

Specific examples of aliphatic hydrocarbon groups for incorporation in this silicone compound include chain hydrocarbon groups such as methyl, propyl, butyl, hexyl, octyl, decyl, trifluoropropyl and glycidyloxypropyl groups; and alicyclic hydrocarbon groups such as cyclohexyl and methylcyclohexyl groups. Specific examples of aromatic hydrocarbon groups include phenyl, p-tolyl and biphenyl groups. Specific examples of alkoxy groups include methoxy, ethoxy, phenoxy, octyloxy and ter-butoxy groups.

The types of the preceding $R_1$-$R_{12}$ and the values of a, b, c and d are not particularly important and accordingly not particularly specified, so long as the silicone compound is compatible with the polysilane and organic solvent used and together provide a transparent film. If the compatibility is of concern, the silicone compound preferably has the same hydrocarbon group as contained in the polysilane used. For example, in the case where phenylmethyl-based polysilane is used, the use of a phenylmethyl- or diphenyl-based silicone compound is preferred. The silicone compound having at least two alkoxy groups in a molecule, such as the silicone compound in which at least two of $R_1$-$R_{12}$ are alkoxy groups having carbon numbers of 1-8, serves as a crosslinking agent. Examples of such silicone compounds include methylphenylmethoxy silicone and phenylmethoxy silicone, each having an alkoxy group content by weight of 15-35%.

The silicone compound having a weight average molecular weight of not higher than 10,000, more preferably not higher than 3,000, is suitably used.

As described above, the double bond-containing silicone compound accounts for 40-100% by weight of the silicone compound. If the double bond-containing silicone compound content is less than 40% by weight, the effect of the present invention that simultaneously achieves optimization of a core shape and minimization of propagation and coupling losses may not be obtained sufficiently.

(Organic Peroxide)

The organic peroxide for use in the present invention is not particularly specified in type, so long as it is a compound which can efficiently insert oxygen into an Si—Si bond of the polysilane used. The organic peroxide may be in the form of a peroxy ester. The use of benzophenone-containing organic peroxides is particularly preferred.

A typical example of the peroxy ester is 3,3',4,4'-tetra(t-butyl peroxy carbonyl) benzophenone (hereinafter referred to as "BTTB"). Also, the organic peroxide acts to double bonds in the silicone compound and effectively promotes an addition polymerization reaction between such double bonds.

(Polysilane Composition)

In the polysilane composition of the present invention, a polysilane compound and a silicone compound are blended in the ratio by weight of 80:20-5:95, preferably 70:30-40:60, as described above. If the amount of the polysilane compound is below the specified range, curing may become insufficient. On the other hand, if it exceeds the specified range, cracking may occur.

The polysilane composition also contains an organic peroxide preferably in the amount of 1-30 parts by weight, more preferably 2-10 parts by weight, based on 100 parts by weight of the aforesaid polysilane compound and silicone compound. If the loading of the organic peroxide is excessively below the specified range, the effect of this invention that enables short-time and uniform photobleaching of a lateral cladding layer may not be obtained sufficiently. If it is excessively large, an optical propagation loss of the resulting waveguide may increase.

In the present invention, the polysilane composition is generally supplied in the form of a dilute solution in a solvent capable of dissolving polysilane. Suitable solvents include aromatic hydrocarbons such as benzene, toluene, xylene and methoxybenzene; and ether solvents such as tetrahydrofuran and dibutyl ether. Preferably, the solvent is used within such a range that brings a polysilane concentration to 20-90% by weight.

(Action)

The polysilane composition of the present invention contains the double bond-containing silicone compound. When its particular region is exposed to an ultraviolet radiation, the exposed region is rendered into a lateral cladding layer and the unexposed region into a core layer. In the exposed region, an Si—Si bond in polysilane is broken to produce an Si—O—Si bond, as similar to the conventional case. This lowers a refractive index of the exposed region. Also, an addition polymerization reaction of double bonds occurs to result in the formation of a lateral cladding layer having a higher hardness than conventional ones. As a result, a satisfactory core shape can be retained. Thus, the use of the polysilane composition of the present invention leads to the formation of a relatively hard, lateral cladding layer. This allows higher loading of the silicone compound than conventional. The higher loading of the silicone compound improves exposure sensitivity of the polysilane composition and increases a difference in refractive index between the core layer and the lateral cladding layer. Therefore, both the propagation loss and the coupling loss can be lowered.

In accordance with the present invention, the core layer and the lateral cladding layer can be formed while attaining optimization of a core shape and minimization of a propagation loss and a coupling loss in an optical waveguide.

BRIEF DESCRIPTION OF THE DRAWINGS

FIG. 1 diagrammatically shows an optical waveguide in the process of being fabricated according to the first aspect of the fabrication method of the present invention;

FIG. 2 diagrammatically shows an optical waveguide in the process of being fabricated according to the second aspect of the fabrication method of the present invention; and FIG. 3 diagrammatically shows an optical waveguide in the process of being fabricated according to the third aspect of the fabrication method of the present invention.

DESCRIPTION OF THE PREFERRED EXAMPLES

The following synthesis examples and examples illustrate the practice of the present invention more specifically, but are not intended to be limiting thereof.

(Synthesis Example of Polysilane)

400 ml of toluene and 13.3 g of sodium were charged into a 1,000 ml flask equipped with a stirrer. The flask contents were heated in an ultraviolet-shielded yellow room to 111° C. and stirred at a high speed to provide a fine dispersion of sodium in toluene. 42.1 g of phenylmethyldichlorosilane and 4.1 g of tetrachlorosilane were added to the dispersion which was then stirred for 3 hours to effect polymerization. Thereafter, ethanol was added to the reaction mixture to deactivate excess sodium. Subsequent to washing with water, a separated organic layer was introduced into ethanol to precipitate polysilane. The resulting crude polysilane was reprecipitated three times from ethanol to obtain branched polymethylphenylsilane with a weight average molecular weight of 11,600.

(Preparation of Polysilane Composition)

Polymethylphenylsilane (PMPS) obtained in the preceding Synthesis Example, a vinyl-containing phenylmethylsilicone resin (product name "KR-2020", Mw=2,900, iodine number=61) and an organic peroxide BTTB (product of NOF Corp., solids content by weight of 20%) were mixed in the proportions specified in Table 2 and then dissolved in methoxybenzene (product name "ANISOLE-S", product of Kyowa Hakko Chemical Co., Ltd.) to a solids content by weight of 77% to prepare polysilane compositions No. 1-No. 5. In addition to the double bond-containing silicone compound, a methoxy-containing phenylmethylsilicone resin (product name "DC-3074", product of Dow Corning Corp.) was further incorporated in the polysilane composition No. 4.

TABLE 2

| Composition No. | Formulation (% by weight) | | | |
|---|---|---|---|---|
| | PMPS | KR-2020 | DC-3074 | BTTB |
| 1 | 67 | 33 | 0 | 5 |
| 2 | 50 | 50 | 0 | 3.8 |
| 3 | 40 | 60 | 0 | 3 |
| 4 | 40 | 30 | 30 | 3 |
| 5 | 30 | 70 | 0 | 2.3 |

(Preparation of Solution for Formation of Upper and Lower Claddings)

100 parts by weight of a vinyl-containing phenylmethylsilicone resin (product name "X-40-2667A", Mw=2,600, iodine number=65, product of Shin-Etsu Silicon Co., Ltd.) and 5 parts by weight of a curing agent (product name "X-40-2667B", product of Shin-Etsu Silicon Co., Ltd.) were mixed and then dissolved in anisole to prepare a solution having a solids content by weight of 95% for use in the formation of upper and lower claddings.

EXAMPLE 1

Polymer optical waveguides were fabricated according to the first aspect of the fabrication method of the present invention, as shown in FIG. 1.

Figure 1A:
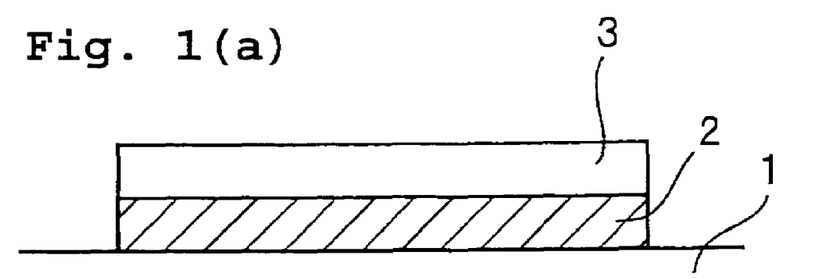

As shown in FIG. 1(a), the solution for forming upper and lower claddings was spin coated onto a glass substrate 1, prebaked at 150° C. for 30 minutes and then postbaked at 200° C. for 30 minutes to form a 20 µm thick, lower cladding layer 2.

Each of the above-synthesized polysilane compositions No. 1-No. 5 was spin coated on the lower cladding layer 2 and then prebaked at 130° C. for 30 minutes to form a 50 µm thick polysilane layer 3.

The polysilane layer 3 was exposed to an ultraviolet radiation through a photomask located above its region corresponding to a core layer 3a. The ultraviolet irradiation was performed using an ultraviolet radiation of 310 nm wavelength and 15 J/cm$^2$ radiation energy.

Figure 1B:
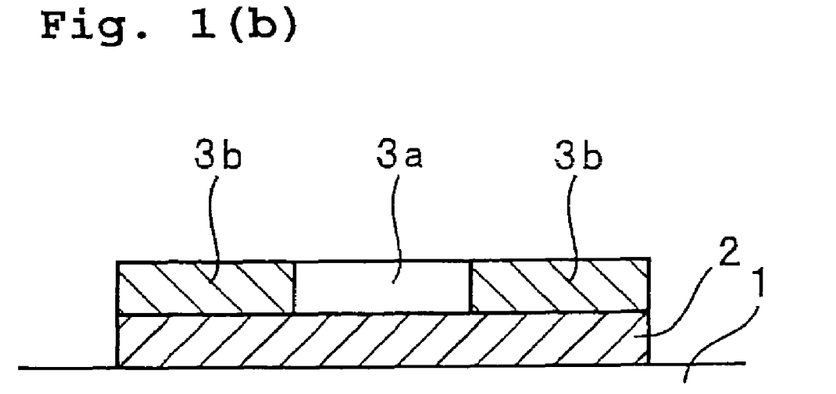

Thereafter, postbaking was carried out at 150° C. for 30 minutes. By this postbaking, the region corresponding to a lateral cladding layer 3b was photobleached and lowered in refractive index to form the lateral cladding layer 3b, as shown in FIG. 1(b). After the formation of the lateral cladding layer 3b, the unexposed region was left as the core layer 3a.

Figure 1C:
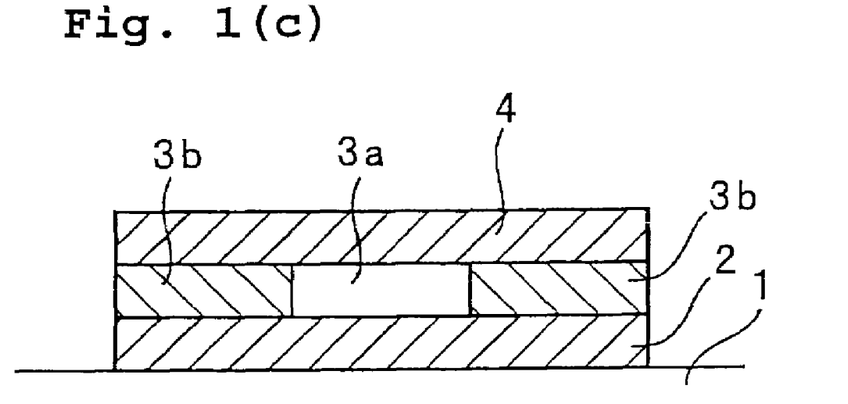

As shown in FIG. 1(c), the solution for formation of upper and lower claddings was spin coated on the core layer 3a and the lateral cladding layer 3b, prebaked at 150° C. for 30 minutes and then postbaked at 200° C. for 30 minutes to form a 20 µm thick, upper cladding layer 4.

EXAMPLE 2

A polymer optical waveguide was fabricated according to the second aspect of the fabrication method of the present invention, as shown in FIG. 2.

Figures 2A, 2B, 2C:
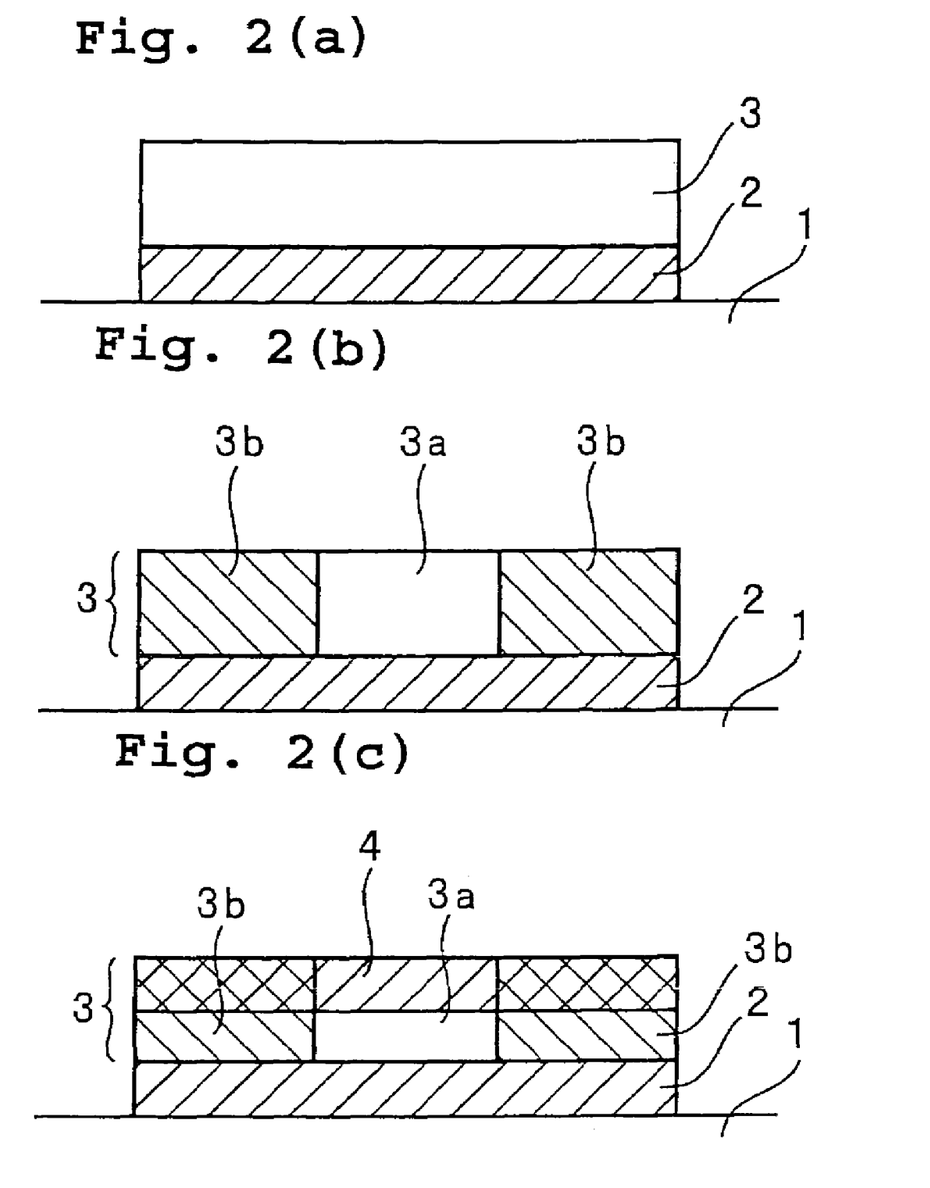

As shown in FIG. 2(a), the solution for forming upper and lower claddings was spin coated onto a glass substrate 1, prebaked at 150° C. for 30 minutes and then postbaked at 200° C. for 30 minutes to form a 20 µm thick, lower cladding layer 2.

The polysilane composition No. 3 in the form of a solution was spin coated on the lower cladding layer 2 and then prebaked at 130° C. for 30 minutes to form a 70 µm thick polysilane layer 3.

The polysilane layer 3 was exposed to an ultraviolet radiation through a photomask located above its region corresponding to a core layer 3a. The ultraviolet irradiation was performed using an ultraviolet radiation of 310 nm wavelength and 15 J/cm$^2$ radiation energy.

Thereafter, postbaking was carried out at 145° C. for 30 minutes and then at 190° C. for 5 minutes. By this postbaking, the region corresponding to a lateral cladding layer 3b was photobleached and lowered in refractive index to form the lateral cladding layer 3b, as shown in FIG. 2(b). The unexposed region was left as the core layer 3a.

After removal of the photomask, the polysilane layer was irradiated from above with an ultraviolet radiation of 310 nm wavelength and 25 J/cm$^2$ radiation energy. Then, postbaking was carried out at 145° C. for 30 minutes and at 200° C. for 30 minutes. By this process, the respective upper regions of the core layer 3a and the lateral cladding layer 3b were photobleached and lowered in refractive index to thereby form a 20 μm thick, upper cladding layer 4, as shown in FIG. 2(c).

EXAMPLE 3

A polymer optical waveguide was fabricated according to the third aspect of the fabrication method of the present invention, as shown in FIG. 3.

Figure 3A:
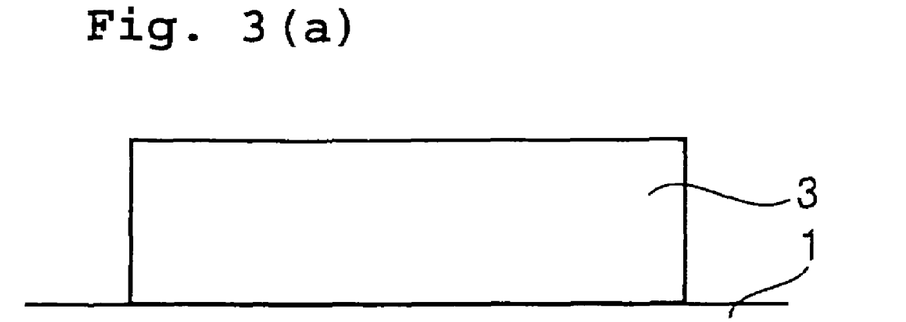

As shown in FIG. 3(a), the polysilane composition No. 3 in the form of a solution was spin coated onto a glass substrate 1 and then prebaked at 130° C. for 30 minutes to form a 80 μm thick polysilane layer 3.

Figure 3B:
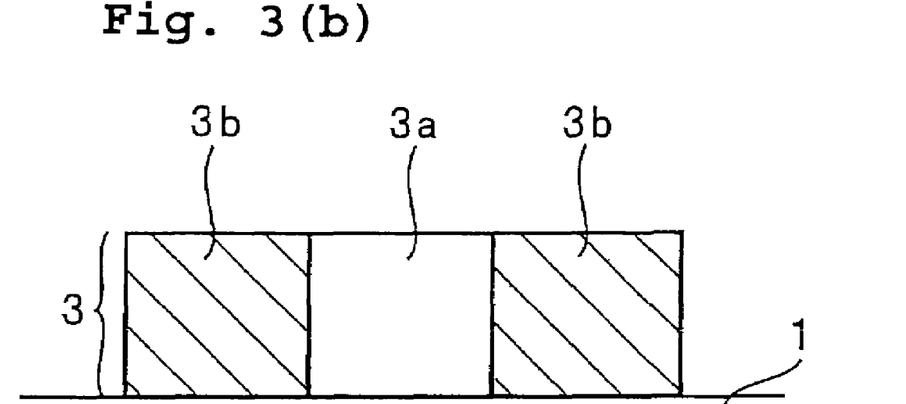

This polysilane layer 3 was exposed to an ultraviolet radiation through a photomask located above its region corresponding to a core layer 3a. The ultraviolet irradiation was performed using an ultraviolet radiation of 310 nm wavelength and 15 mJ/cm$^2$ radiation energy. Subsequently, postbaking was carried out at 145° C. for 30 minutes and at 190° C. for 5 minutes. By this process, the region corresponding to a lateral cladding layer 3b was photobleached and lowered in refractive index to form the lateral cladding layer 3b, as shown in FIG. 3(b). The unexposed region was left as the core layer 3a.

Figure 3C:
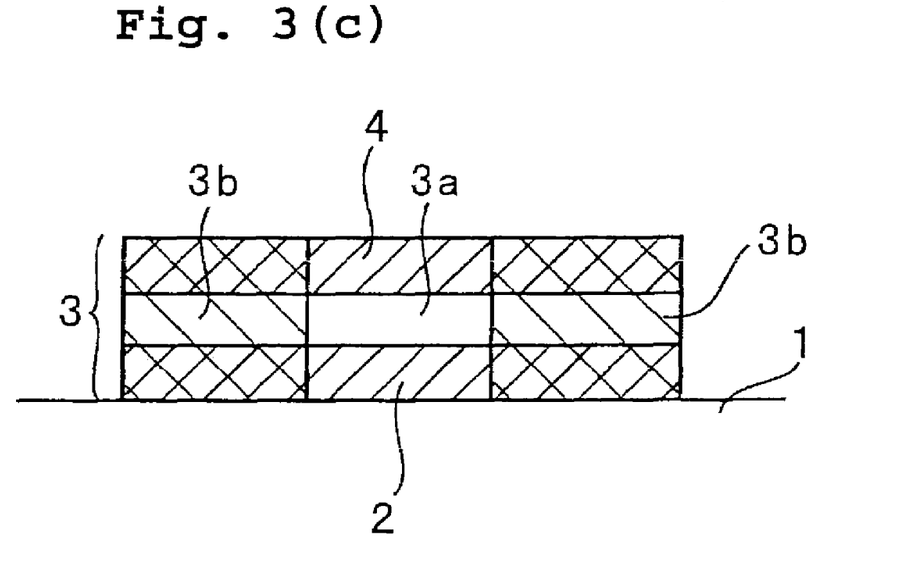

After removal of the photomask, the polysilane layer was irradiated from a back side of the glass substrate 1 with an ultraviolet radiation of 310 nm wavelength and 10 J/cm$^2$ radiation energy and then irradiated from above with an ultraviolet radiation of 310 nm wavelength and 25 J/cm$^2$ radiation energy. By such ultraviolet irradiation from a substrate side and from above, its regions corresponding to a lower cladding layer 2 and an upper cladding layer 4 were photobleached and lowered in refractive index to form a 10 μm thick, lower cladding layer 2 and a 20 μm thick, upper cladding layer 4, as shown in FIG. 3(c). Postbaking was then carried out at 145° C. for 30 minutes and at 200° C. for 30 minutes.

COMPARATIVE EXAMPLE 1

A methoxy-containing phenylmethylsilicone resin (product name "DC-3074", product of Dow Corning Corp.), instead of the double bond-containing silicone compound, was used as the silicone compound. This silicone compound, the polysilane compound and the organic peroxide were mixed in the proportions specified in Table 3 to prepare polysilane compositions No. 6 and No. 7. The procedure of Example 1 was followed, except that these compositions were used in the formation of polysilane layers, to fabricate polymer optical waveguides.

TABLE 3

| Composition | Formulation (% by weight) | | |
|---|---|---|---|
| No. | PMPS | DC-3074 | BTTB |
| 6 | 67 | 33 | 5 |
| 7 | 75 | 25 | 5.6 |

(Evaluation of Exposure Sensitivity of Polysilane Composition)

Exposure sensitivities of the polysilane compositions No. 1-No. 5 in accordance with the present invention and the polysilane compositions No. 6 and No. 7 obtained in the Comparative Example were evaluated according to the following procedure.

A solution of each polysilane composition was spin coated onto a 5 cm by 5 cm square quartz substrate and then prebaked at 130° C. for 30 minutes. During this process, the coating film was adjusted to a thickness at which an absorption coefficient for Si—Si at 350 nm reached a value of 1 when measured using a spectrophotometer (MCPD-3000, product of Otsuka Electronics Co., Ltd). The thickness was adjusted by the concentration of the solution or by recoating.

The coating film was exposed to a radiation of 5, 10 and 15 mJ/cm$^2$, with an increment of 5 mJ/cm$^2$, to prepare samples. An absorption coefficient of each sample for Si—Si at 350 nm was also measured.

The measured absorption coefficient values were plotted along the ordinate versus the exposure amount along the abscissa. The exposure amount needed to reduce the absorption coefficient for Si—Si at 350 nm to a half value (=0.5) was defined as the exposure sensitivity. The exposure sensitivity of up to 10 mJ/cm$^2$ was regarded as acceptable.

(Evaluation of Optical Waveguides)
(Evaluation of Core Shape)

Each of the waveguides fabricated in Examples 1-3 and Comparative Example 1 was cut by a dicing saw to provide a 2 cm long linear waveguide. This linear waveguide was placed on a stage of an optical microscope such that its cut surface stood perpendicular to the stage, and its core shape was observed under a microscope with a transmitted light. The observed core shape was evaluated according to the following standards:

⊚ . . . upright and rectangular in shape

◯ . . . upright x . . . not upright (Evaluation of Propagation Loss and Coupling Loss)

Each of the waveguides fabricated in Examples 1-3 and Comparative Example 1 was subjected to a cutout method with its lengths of 2 cm, 4 cm and 6 cm, using a dicing saw, to perform loss measurements. A multimode fiber having a core size of 50 μm was used in the input side to inject a radiation at a wavelength of 830 nm. A multimode fiber having a core size of 62.5 μm was used in the output side. Loss (unit: dB) along the ordinate was plotted versus waveguide length (unit: cm) along the abscissa. A least-squares fit on the data was performed to obtain an approximate line. A propagation loss (unit: dB/cm) was determined from a slope of the line and a coupling loss (unit: dB) was determined from a loss when waveguide length was 0 cm (=intercept of the line on the abscissa).

The sample is judged as acceptable when its propagation loss does not exceed 0.2 dB/cm and its coupling loss does not exceed 2 dB.

The results are shown in Table 4.

TABLE 4

| | | Waveguide Evaluation | | | |
|---|---|---|---|---|---|
| | Composition No. | Exposure Sensitivity mJ/cm$^2$ | Core Shape | Propagation Loss dB/cm | Coupling Loss dB |
| Example 1 | 1 | 10 | ◯ | 0.2 | 2 |
| | 2 | 8 | ◯ | 0.2 | 2 |
| | 3 | 3 | ⊚ | 0.1 | Not Higher Than 1 |
| | 4 | 5 | ⊚ | 0.1 | 2 |
| | 5 | 6 | ◯ | 0.2 | 2 |
| Example 2 | 3 | 3 | ⊚ | 0.1 | Not Higher Than 1 |
| Example 3 | 3 | 3 | ⊚ | 0.1 | Not Higher Than 1 |
| Comparative Example 1 | 6 | 12 | X | 0.2 | 2 |
| | 7 | 15 | ◯ | 0.3 | 4 |

As can be clearly seen from the results shown in Table 4, the polysilane compositions used in Examples 1-3 in accordance with the present invention exhibit satisfactory exposure sensitivities and the core layers formed from such compositions have satisfactory shapes. In addition, the waveguides fabricated using such compositions exhibit low degrees of propagation loss and coupling loss.

As demonstrated above, in accordance with the present invention, optimization of a core shape and minimization of a propagation loss and a coupling loss can be simultaneously achieved in a waveguide.

What is claimed is:

1. An optical waveguide including a core layer, a lateral cladding layer located to laterally surround the core layer, a lower cladding layer located to underlie the core layer and the lateral cladding layer, and an upper cladding layer located to overlie the core layer and the lateral cladding layer; characterized in that said core layer and said lateral cladding layer are both formed from a polysilane composition comprising:

a polysilane compound and a silicone compound in a ratio (polysilane compound:silicon compound) by weight of 80:20-5:95, said silicone compound containing 40-100% by weight of a double bond-containing silicone compound; and an organic peroxide in the amount of 1-30 parts by weight, based on 100 parts by weight of said polysilane compound and silicone compound.

2. The optical waveguide as recited in claim 1, characterized in that said lower cladding layer and/or said upper cladding layer is formed from the polysilane composition.

3. The optical waveguide as recited in claim 1, characterized in that said double bond in the silicone compound is in the form of a vinyl, allyl, acryloyl or methacryloyl group.

* * * * *